Oct. 14, 1930. J. H. HOLLOWAY 1,778,190
CHARGE FORMING APPARATUS
Filed March 21, 1928
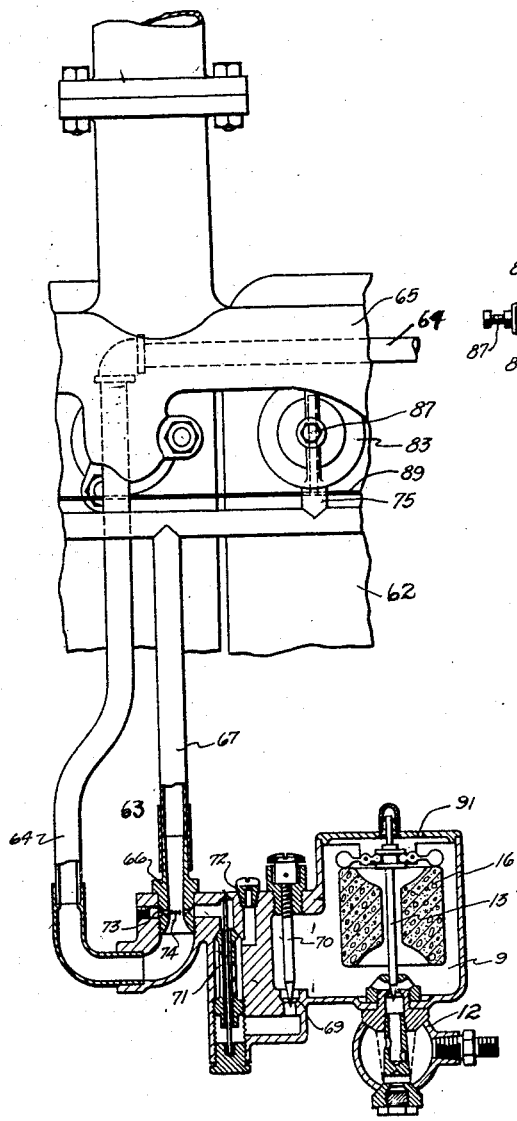
INVENTOR.
John H. Holloway
BY
Quarles & French
ATTORNEYS Patented Oct. 14, 1930

1,778,190

UNITED STATES PATENT OFFICE

JOHN H. HOLLOWAY, OF GREEN BAY, WISCONSIN, ASSIGNOR TO NORTHWEST ENGINEERING CORPORATION, OF GREEN BAY, WISCONSIN, A CORPORATION OF WISCONSIN

CHARGE-FORMING APPARATUS

Application filed March 21, 1928. Serial No. 263,491.

The invention relates to an apparatus for preparing a vaporous mixture of fuel and air for use in internal combustion engines, with special reference to fuels of high boiling points.

The object of the invention is to provide a charge-forming apparatus of the type in which the fuel in a finely atomized condition is vaporized to form a rich mixture by direct heating contact with a stream of primary air previously heated to a temperature sufficient to vaporize a substantial proportion of the fuel, and wherein means are provided for efficiently distributing and mixing the rich vaporous mixture with the proportioning air charge and for controlling the relative proportions of rich mixture and proportioning air in connection with the feeding of such mixture to the cylinder of a multicylinder engine.

The invention further consists in the several features hereinafter set forth and more particularly defined by claims at the conclusion hereof.

In the drawings Fig. 1 is an elevation view of apparatus embodying the invention;

Fig. 2 is an enlarged detail view of a portion of the apparatus shown in Fig. 1, parts being broken away and parts being shown in section;

Fig. 3 is a detail sectional view taken on the line 3—3 of Fig. 2.

In the drawings the numeral 62 designates the engine cylinders, 65 the exhaust manifold, 67 the inlet manifold, 63 the fuel-treating apparatus, including a pipe 64 passing through the exhaust manifold for a considerable portion of its length.

The fuel-treating apparatus includes a float-chamber 9 to which fuel is supplied from an inlet fitting 12 under the control of a needle valve 13 whose action is controlled by a float 16. The fuel passes from said chamber past an orifice 69, whose size is varied by the adjustment of a needle 70, to a nozzle 71 that may be air-bled from a plug 72, and thence to a nozzle 73 having openings 74 leading into the throat of the venturi 66. This compound nozzle is only illustrative of one form of metering device that may be used with the other elements of the combination forming the subject matter of the present invention. The pipe 64 leads from the exhaust manifold to the inlet end of the mixing passage 66 and conducts the primary air thereto.

The primary air flowing through the pipe 64 is highly heated by the exhaust heat, preferably to five hundred degrees Fahrenheit or more, so that when this air encounters the fuel in finely atomized condition, issuing into the mixing passage through the openings 74, the whole or a substantial proportion of the fuel is vaporized and the heating effect of this air on the fuel is prolonged for a considerable period by the passage of the rich mixture thus formed through the separate manifold 67 and this mixture is not mixed with the cooler proportioning air until just before entering the engine cylinders.

Each branch 75 of the manifold 67 extends into an inlet pipe section 76 associated with the inlet passage 77 of each cylinder head 77'. Each of these pipe sections has a throttle valve 78 therein and the outlet 79 of each of the branches 75 is controlled by a valve 80 whose stem passes through the rear of said outlet and carries a disk valve 81 controlling the passage of proportioning air through the passage 82 of a fitting 83 secured at its inner end to the pipe section 76 and open at its outer end, as at 84. A spring 85, connected at one end to the stem 86 of the valves 80 and 81 and at its other end to an adjustable screw 87 on the outer end of the fitting 83, normally urges said valves to a closed position. As the suction pressure increases these valves will be opened to a greater extent, the suction pressure in turn being controlled by the throttle valve 78 in each conduit, either under manual or governor control. All the throttle valves 78 are connected to a rod 89 by having their crank arms 90 connected therewith.

Thus, the rich, vaporous mixture, formed as above described, is brought into contact with the cooler proportioning air just before entering the engine cylinder, thereby insuring efficient heating of the fuel in highly heated primary air and insuring equal distribution to the engine cylinders and good volumetric efficiency, it being noted also that the amount of rich mixture is preferably about thirty per cent. of the total charge mixture at full load.

As the heavy fuel requires the primary air to be in a highly heated condition for satisfactory operation, the engine, when using heavy fuel, is first started on gasoline, by suitable connection of the fitting 12 with a source of supply, and is thereafter switched over onto the heavier fuel by a connection of said fitting with this source.

I desire it to be understood that this invention is not to be limited to any particular form or arrangement of parts except in so far as such limitations are specified in the claims.

What I claim as my invention is:

1. In a charge-forming apparatus for multicylinder internal combustion engines, the combination with a mixing passage, of a spray nozzle delivering fuel thereto, a primary air conduit delivering air to said passage, means for heating the air in said primary air passage to a temperature sufficient to vaporize a substantial proportion of the fuel previous to the delivery of said air to said passage, a manifold for distributing the rich, vaporous mixture, formed by a direct heating contact of said highly heated primary air and atomized fuel in said mixing passage, to the engine cylinders, means for supplying each of said cylinders with proportioning air to form with said rich, vaporous mixture the complete charge adjacent the inlets of said cylinders, and separate suction-operated valves at the entrance end of each proportioning air conduit and the delivery ends of the branches of the vaporous mixture manifold.

2. In a charge-forming apparatus for multicylinder internal combustion engines, the combination with a mixing passage, of a spray nozzle delivering fuel thereto, a primary air conduit delivering air to said passage, means for heating the air in said primary air passage to a temperature sufficient to vaporize a substantial proportion of the fuel previous to the delivery of said air to said passage, a manifold for distributing the rich, vaporous mixture, formed by a direct heating contact of said highly heated primary air and atomized fuel in said mixing passage, to the engine cylinders, means for supplying each of said cylinders with proportioning air to form with said rich, vaporous mixture the complete charge adjacent the inlets of said cylinders, separate suction-operated valves at the entrance of each proportioning air conduit and the delivery ends of the branches of the vaporous mixture manifold, and means connecting said valves together for simultaneous operation.

3. In a charge-forming apparatus for multicylinder internal combustion engines, the combination with a mixing passage, of a spray nozzle delivering fuel thereto, a primary air conduit delivering air to said passage, means for heating the air in said primary air passage to a temperature sufficient to vaporize a substantial proportion of the fuel previous to the delivery of said air to said passage, a manifold for distributing the rich, vaporous mixture, formed by a direct heating contact of said highly heated primary air and atomized fuel in said mixing passage, to the engine cylinders, means for supplying each of said cylinders with proportioning air to form with said rich, vaporous mixture the complete charge adjacent the inlets of said cylinders, separate suction-operated valves at the entrance end of each proportioning air conduit and the delivery ends of the branches of the vaporous mixture manifold, means connecting said valves together for simultaneous operation, a throttle valve in each of the charge mixture conduits for controlling the supply of completed charge mixture to each engine cylinder, and means for conjointly operating said throttle valves.

4. In a charge-forming apparatus for multicylinder internal combustion engines, the combination with a mixing passage, of a spray nozzle delivering fuel thereto, a primary air conduit delivering air to said passage, means for heating the air in said primary conduit to a temperature sufficient to vaporize a substantial proportion of the fuel previous to the delivery of said air to said passage, a manifold for distributing the rich, vaporous mixture, formed by a direct heating contact of said highly heated primary air and atomized fuel in said mixing passage, to the engine cylinders, suction-operated valves at the delivery ends of the branches of said manifold, and suction-controlled means for admitting proportioning air to the engine cylinders.

In testimony whereof, I affix my signature.

JOHN H. HOLLOWAY.